United States Patent [19]
Thornton

[11] 3,814,004
[45] June 4, 1974

[54] AUTOMATIC TEA OR COFFEE MAKER

[76] Inventor: William Hermann Brenner Thornton, "Derwent", 1, Milton Close, Henley-on-Thames, England

[22] Filed: Apr. 12, 1972

[21] Appl. No.: 243,292

[30] Foreign Application Priority Data
Apr. 15, 1971  Great Britain................. 9489/71

[52] U.S. Cl..................................... 99/283, 99/289
[51] Int. Cl............................................ A47j 31/00
[58] Field of Search ............ 99/285, 289, 293, 299, 99/281, 283, 282

[56] References Cited
UNITED STATES PATENTS
3,280,721  10/1966  Walker ................................ 99/289
3,662,674  5/1972  Clausse ............................... 99/289

*Primary Examiner*—Robert W. Jenkins
*Attorney, Agent, or Firm*—Norris & Bateman

[57] ABSTRACT

An automatic tea or coffee maker includes a bi-metallic strip or equivalent means mounted where it can be contacted by steam generated in an electrically heated container. When the bi-metallic strip flexes on heating it releases a support holding tea leaves or coffee grounds above the water in the container. The tea leaves or coffee grounds are thus deposited in the water.

6 Claims, 3 Drawing Figures

PATENTED JUN 4 1974 3,814,004

AUTOMATIC TEA OR COFFEE MAKER

DESCRIPTION OF THE PRIOR ART

Automatic tea making apparatus is known in which the steam generated in a water heater builds up pressure to force the water through a spout into a container previously charged with tea leaves or coffee grounds. Such forms of apparatus have the disadvantage of requiring a pressure-tight seal and are also relatively clumsy in that two separate containers are required.

Furthermore it is widely accepted that in order to make the best tea, the tea leaves must be deposited in the water (not vice-versa) whilst the water is boiling or at boiling point and the known devices mentioned above are not wholly satisfactory in this respect.

OBJECTS OF THE INVENTION

An object of this invention is to utilize the heat of steam generated by water boiling in a container to trigger means for depositing tea leaves or coffee grounds in the water.

A further object of the invention is to use the heat of the steam to switch off an electric heating element used for heating the water.

Another object of the invention is to provide a bi-metallic strip arranged to be contacted by the steam and to release a support for the tea leaves or coffee grounds when it flexes on heating, so that the said tea leaves or coffee grounds are deposited in the water.

Yet another object of the invention is to provide said bi-metallic strip in a compartment in a handle of the container with a duct provided through the material of the handle to enable steam to enter the compartment.

DESCRIPTION OF THE PREFERRED EMBODIMENT

Figure 1:
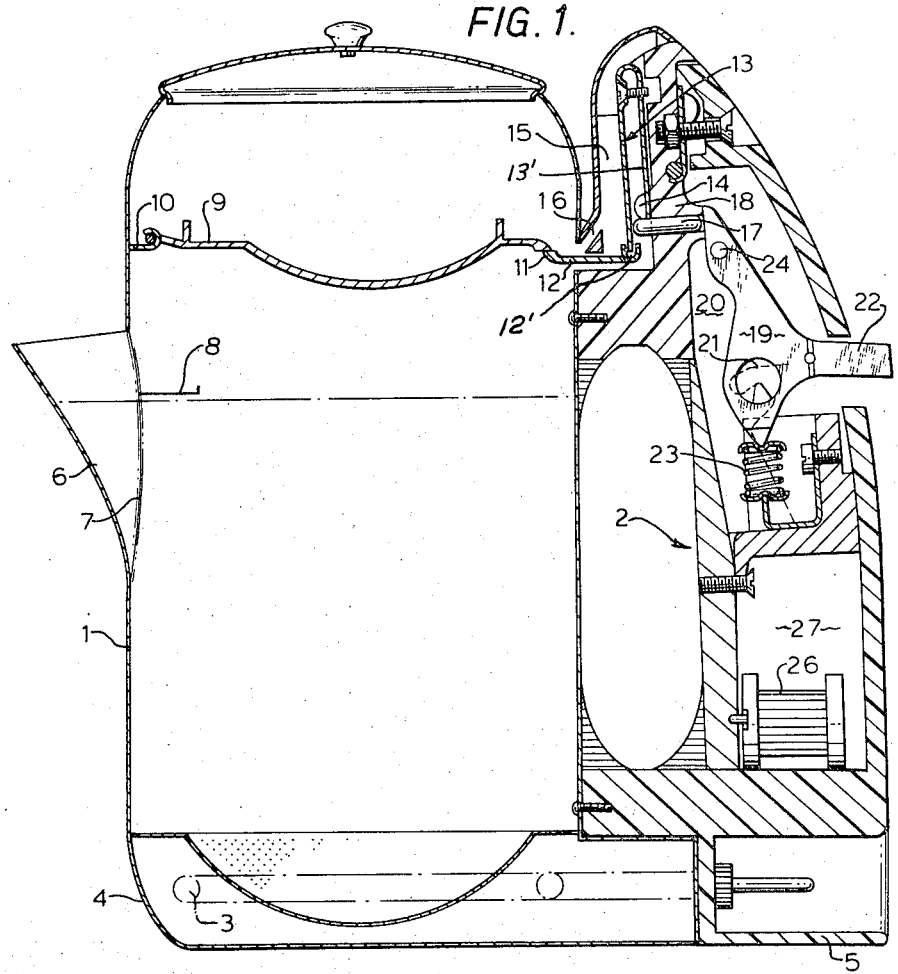
FIG. 1 shows a vertical cross-section through an automatic tea or coffee maker constructed in accordance with the invention.

Referring to FIG. 1, the automatic tea or coffee maker comprises a container 1 having a handle 2 of synthetic plastics material, an electric heating element 3 located in a lower compartment 4, a two-pin electric socket 5, a spout 6, a strainer 7 and a water-level indicator 8 fixed to the strainer 7.

Inside the container 1, in an upper region thereof is a support for tea leaves (or other substance, e.g. coffee grounds, to be infused); the support being constituted by a hollow dish 9 mounted on a hinge 10 which enables the dish to pivot from the illustrated horizontal or "set" position to an inclined or substantially vertical position. The hinge 10 is constituted by an open hook to allow the dish 9 to be removed for cleaning.

When in the "set" position, the dish 9 is supported by a retractable abutment 11 forming one edge of a stainless steel shelf 12. A part 12' of the shelf 12 extends through a small aperture 2' in the exterior wall of the handle 2. A recess 12" adjacent to an edge of the shelf opposite to the abutment 11 accommodates a free end 13' of a bimetallic resilient strip 13 anchored at 14 within a compartment 15 in the handle 2. A small duct 16 connects the compartment 15 to the interior of the container 1.

The bimetallic strip 13' co-operates with one end of a plunger 17 located in a cylindrical opening in an interior wall 18 formed in the handle 2. The other end of the plunger 17 co-operates with a toggle member 19 located in a second compartment 20 of the handle 2.

Figure 2:
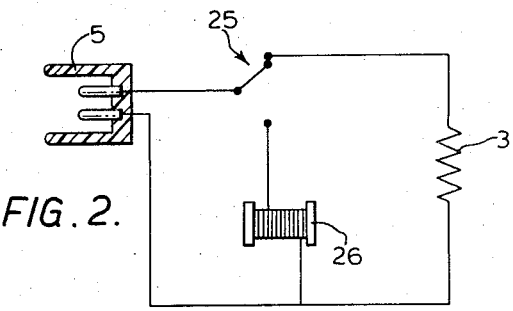
FIG. 2 shows a schematic layout of an electric circuit employed in the tea or coffee maker illustrated in FIG. 1.
Figure 3:
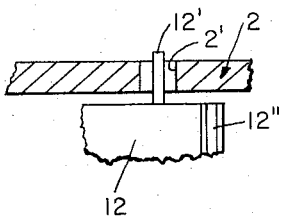
FIG. 3 is a fragmentary diagrammatic view mainly in section showing manual operation of the retractable member.

The toggle member 19 is pivoted at 21 and includes an operating lever 22 which extends through an aperture in the exterior wall of the handle 2. The toggle member 19 is engaged at its lower end by an over-centre action spring 23 which holds it in either one or two limit positions. When moving to one limit position (shown in the drawing) a trunnion 24 on the member 19 throws an electric switch shown at 25 on FIG. 2 to the illustrated position where it completes a circuit containing the heating element 3. When moving to the other limit positon the trunnion 24 throws the switch 25 to its alternative position when it deenergizes heater element 3 and completes a circuit to a buzzer 26 contained in a third compartment 27 in the handle 2. It will be noted that the heater and buzzer cannot operate simultaneously.

To use the illustrated tea or coffee maker the container 1 is first charged with cold water, care being taken not to overfill above the water-level indicator 8. The part 12' of the shelf 12 which extends through the small aperture in the exterior wall of the handle is now moved manually; urging the shelf 11 to the right (as seen in the drawing) against the resilient action of the cold bimetallic strip 13. The dish 9 which is assumed to be in an inclined position (not shown), is then pivoted upwardly past the shelf 12. The shelf 12 is then allowed to be returned by the resiliency of strip 13 to the illustrated position and the dish 9 is allowed to rest on abutment 11 as shown.

The toggle member 19 is moved (if necessary) to the illustrated limit position by lifting the lever 22; a power supply is connected to the socket 5; and the heating element 3 heats and eventually boils the water. Some steam from the boiling water passes through the duct 16 and into the compartment 15 where it heats the bimetallic strip 13. The bimetallic strip 13 consequently flexes and pulls the shelf 12 to the right, releasing the dish 9 from its "set" position and allowing it to hinge downwardly to deposit the tea leaves or coffee grounds in the boiling water. As the bimetallic strip heats up, it also pushes against the plunger 17 which in turn pushes against the toggle member 19. This causes the toggle member to toggle to its other limit position, breaking the circuit to the heating element 3 and completing the circuit to the buzzer 27. Sounding of the buzzer indicates completion of the process.

The illustrated tea or coffee maker can conveniently be used in conjunction with an electric time switch so that the heating element is switched on automatically at any desired time of day.

I claim:

1. An automatic beverage maker comprising a container adapted to hold a quantity of water and having an electric heating element for boiling said water, a support mounted within said container for movement between a first set location where it holds material to be infused above the water level and a second location where it releases said material into the water, a retractable member mounted on the container for movement between a first position for maintaining said material support in its set location and a second position permitting said support to move to its material release location, an energizing circuit having switch means for said heating element, a switch operator on said container movable between switch open and closed positions, temperature responsive means exposed to steam generated by boiling water in the container, a first actuating means operably connecting said temperature responsive means to said retractable member for moving said retractable member to support release position when steam has heated said temperature responsive means and a second actuating means operably connecting said temperature responsive means to said switch operator for moving said switch operator to open said switch when steam has heated said temperature responsive means, said second actuating means being so constructed and arranged as to move said switch operator independently of movement of said retractable member.

2. An automatic beverage maker according to claim 1 wherein said heat responsive means comprises a bimetallic strip and said retractable member is an abutment on which the support can rest in its set location; the bimetallic strip being so connected to said retractable member that when it flexes on heating it retracts the abutment thereby releasing the support from its set position.

3. An automatic beverage maker according to claim 1 wherein said heat responsive means is housed in a handle of said container.

4. An automatic beverage maker according effect claim 1 including a sounding device in said energizing circuit and wherein said switch operator is moved oven operate said sounding device when it opens said switch means to deenergize said heating element.

5. An automatic beverage maker according to claim 1 wherein said container comprises a body within the lower end of which is a reservoir for said water and the upper end of which is open for receiving a closure lid, and said material support is hinged at one end within the body below said opening and adapted to be supported at its other end by said retractable member.

6. An automatic beverage maker according to claim 1, wherein said temperature responsive means is a resilient bimetallic strip device having a flexible end engaged with said retractable member and directly connected to said switch operator by a slidable motion transmitting plunger.

* * * * *